United States Patent
Pino, Jr.

(10) Patent No.: US 11,466,428 B1
(45) Date of Patent: Oct. 11, 2022

(54) MICROTRENCH PLUG AND METHOD FOR SECURING AN OPTICAL FIBER AND/OR MICRODUCT/INNERDUCT IN A MICROTRENCH

(71) Applicant: CCIIP LLC, New York, NY (US)

(72) Inventor: Angelo J. Pino, Jr., New York, NY (US)

(73) Assignee: CCIIP LLC, New York, NY (US)

( * ) Notice: Subject to any disclaimer, the term of this patent is extended or adjusted under 35 U.S.C. 154(b) by 0 days.

(21) Appl. No.: 17/558,911

(22) Filed: Dec. 22, 2021

(51) Int. Cl.
*G02B 6/50* (2006.01)
*E02F 5/12* (2006.01)
*E02F 3/88* (2006.01)

(52) U.S. Cl.
CPC .............. *E02F 5/12* (2013.01); *E02F 3/8816* (2013.01); *G02B 6/504* (2013.01)

(58) Field of Classification Search
CPC .. E02F 3/8816; E02F 5/10; E02F 5/12; E02B 6/504; F16L 1/028; H02G 1/06
See application file for complete search history.

(56) References Cited

U.S. PATENT DOCUMENTS

| | | | |
|---|---|---|---|
| 4,341,007 A * | 7/1982 | Kruszona | B25B 27/0092 29/451 |
| 4,434,861 A | 3/1984 | Howeth | |
| 4,554,724 A * | 11/1985 | Bantz | G05D 1/0265 174/505 |
| 4,668,548 A | 5/1987 | Lankard | |
| 4,744,693 A | 5/1988 | Smith | |
| 4,812,078 A | 3/1989 | Rivard | |
| 5,244,304 A | 9/1993 | Weil | |
| 5,913,638 A | 6/1999 | Lansdale | |
| 6,807,355 B2 * | 10/2004 | Dofher | G02B 6/4441 385/100 |
| 7,095,930 B2 * | 8/2006 | Storaasli | G02B 6/504 385/100 |
| 7,914,618 B1 | 3/2011 | Krozel | |
| 9,203,226 B2 | 12/2015 | Miller | |
| 9,485,468 B2 | 11/2016 | Pino | |
| 10,146,024 B2 * | 12/2018 | Elford | G02B 6/3898 |
| 10,311,102 B2 | 6/2019 | Pino | |
| 10,330,882 B2 * | 6/2019 | Schwengler | G02B 6/504 |

(Continued)

FOREIGN PATENT DOCUMENTS

CA 2348062 11/2001

OTHER PUBLICATIONS

Camplex FiberOptic Extender, http://www.camplex.com/product.aspx?item=CMX-TACNGO-SDI, Oct. 17, 2017 pp. 1-2.

(Continued)

*Primary Examiner* — Benjamin F Fiorello
(74) *Attorney, Agent, or Firm* — Jeffrey S. Melcher; Melcher Patent Law PLLC

(57) ABSTRACT

A method of securing optical fiber and/or innerduct/microduct 140 within a microtrench 11 by laying the optical fiber and/or innerduct/microduct 140 within a microtrench 11 and inserting a plurality of microtrench plugs 6 into the microtrench 11 above the optical fiber and/or innerduct/microduct 140 to secure the optical fiber and/or innerduct/microduct 140 in the microtrench 11 and reduce bowing of the optical fiber and/or innerduct/microduct 140 up from a bottom of the microtrench 11.

12 Claims, 5 Drawing Sheets

(56) References Cited

U.S. PATENT DOCUMENTS

| | | | |
|---|---|---|---|
| 10,571,045 B2 | 2/2020 | Pino | |
| 10,571,047 B2 | 2/2020 | Pino | |
| 10,641,414 B2 | 5/2020 | Pino | |
| 10,774,948 B2 * | 9/2020 | Elford | F16L 1/028 |
| 10,781,942 B2 | 9/2020 | Pino | |
| 10,808,377 B1 | 10/2020 | Pino | |
| 10,808,379 B1 | 10/2020 | Pino | |
| 10,851,517 B2 | 12/2020 | Pino | |
| 10,876,654 B2 | 12/2020 | Pino | |
| 10,883,629 B2 | 1/2021 | Pino | |
| 11,028,556 B1 | 6/2021 | Pino | |
| 2002/0061231 A1 * | 5/2002 | Finzel | G02B 6/4463 405/184 |
| 2004/0115004 A1 * | 6/2004 | Serrano | H02G 1/06 405/176 |
| 2004/0149174 A1 | 8/2004 | Farrington | |
| 2005/0036749 A1 | 2/2005 | Vogel | |
| 2005/0189127 A1 | 9/2005 | Martin | |
| 2005/0191133 A1 * | 9/2005 | Purcell | G02B 6/504 405/157 |
| 2011/0070030 A1 * | 3/2011 | Miller | E02F 3/8816 405/180 |
| 2013/0011198 A1 | 1/2013 | Pichler | |
| 2013/0284070 A1 | 10/2013 | Dubey | |
| 2015/0125218 A1 | 5/2015 | Gustavsson | |
| 2015/0300527 A1 * | 10/2015 | Konczak | F16L 1/028 405/154.1 |
| 2016/0369610 A1 | 12/2016 | Wright | |
| 2016/0376767 A1 | 12/2016 | Miller | |
| 2018/0106015 A1 | 4/2018 | Pino | |
| 2018/0156357 A1 | 6/2018 | Pino | |
| 2018/0292027 A1 | 10/2018 | Pino | |
| 2019/0086002 A1 | 3/2019 | Pino | |
| 2019/0226603 A1 | 7/2019 | Pino | |

OTHER PUBLICATIONS

Corning Fiber Optic Extenders, https://www.corning.com/worldwide/en/products/communication-networks/products/fiber.html, Oct. 17, 2017 pp. 1-7.

SC Polymer, https://www.surecretedesign.com/product/liquid-concrete-polymer/, Oct. 17, 2017 p. 1.

SCAG Giant VAC, http://www.giant-vac.com/, Oct. 17, 2017 pp. 1-2.

DR Power Vacuum, https://www.drpower.com/, Oct. 17, 2017 pp. 1-2.

Billy Goat vaccum, www.billygoat.com, Oct. 17, 2017 pp. 1-2.

Trenchers, www.vermeer.com, Oct. 17, 2017 pp. 1-15.

Trenchers, www.samarais.com, Oct. 17, 2017 pp. 1-2.

King, "Google Fiber finishes digging very shallow grave in Louisville, KY. #RIP," https:/lwww.pocketables.com/2019/021 Joogle-fiber-finishes-digging-very-shallow-grave-in-louisville-ky-rip.html, published on Pocketable on Feb. 7, 2019, pp. 1-9.

Blum, "Microtrenching fail drives Google Fiber out of Louisville," https:/lwww.tellusventure.com/blog/microtrenching-ail-drives-google-fiber-out--of-louisville/, published on Tellus Venture Associates, Feb. 8, 2019, pp. 1-3.

Otts, "Where is Google Fiber? Mostly in the Highlands, records show," hllps://www.wdrb.com/news/business/sunday-3edition-where-is-google-fiber-moslly-in-the-highlands/article_569112e0-421 e-58ef-be24-c2e42e5e53d2.html, published in the Sunday Edition, WDRB, Sep. 14, 2018, pp. 1-10.

FASTRACT 400 material data sheet Aug. 23, 2018, pp. 1-4.

https://www.youtube.com/watch?v=0CGi92UK4Tw, Optic Fiber nastro in Torino, published Mar. 7, 2016, Garbin Group, pp. 1-3.

https://www.youtube.com/watch?v=klWluvLc5cl, The Ditch Witch MT12 MicroTrencher: Faster, Cleaner, Better, published Jun. 14, 2016, pp. 1-4.

https://www.youtube.com/watch?v=VWryq2nOA3U, Micro trenching | MTT-system, published Sep. 26, 2016, vww.mttsystem.com, pp. 1-3.

https://www.youtube.com/watch?v=7xf2Ujax9hU, published Nov. 10, 2011, Micro-Trenching—alternative Moglichkeitzur Verlegung von Glasfaserkabeln, Schmidt@buglas.de, pp. 1-3.

https://www.youtube.com/watch?v=OlxA3gqNPkE, BVS-net, microtrenching, published Nov. 29, 2014, www.bvs-net.eu, pp. 1-3.

https://www.youtube.com/watch?v=929vJtv5Uxw, www, dellcron.com, published Feb. 10, 2018, pp. 1-3.

https://www.youtube.com/watch?v=8p4xHlwuMhl, Americicom, www.americomtech.com, Microtrenching, published Jun. 10, 2017, pp. 1-3.

https://www.youtube.com/watch?v=57NBkB1y8iM, published Jan. 14, 2014, KNET Micro Trenching Solution, pp. 1-4.

Geophysical Survey Systems, www.geophysical.com/products, pp. 1-23, 2020.

UtilityScan DF, quick start guide, MN72-489, pp. 1-68, pp. 2017-18.

* cited by examiner

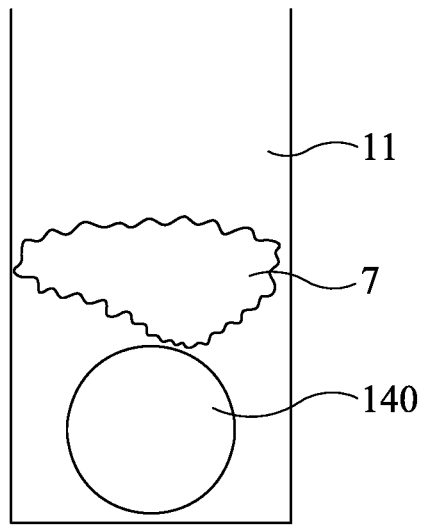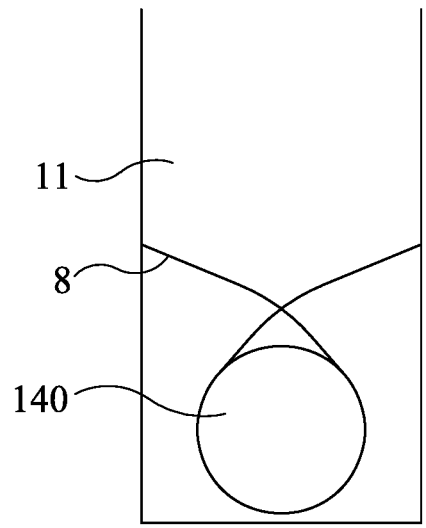
FIG. 3A  FIG. 3B
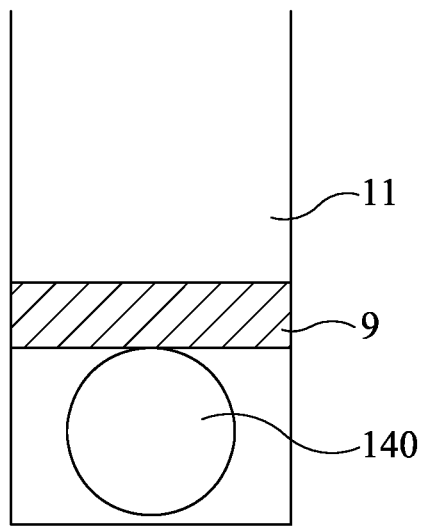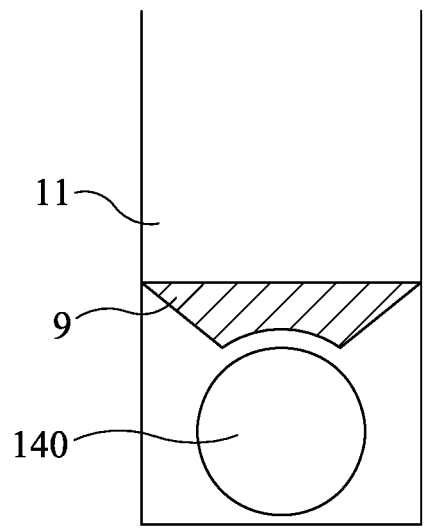
FIG. 3C  FIG. 3D

MICROTRENCH PLUG AND METHOD FOR SECURING AN OPTICAL FIBER AND/OR MICRODUCT/INNERDUCT IN A MICROTRENCH

FIELD OF THE INVENTION

The invention generally relates to a microtrench plug and method of using the microtrench plug to secure optical fiber cable and/or microduct/innerduct in a microtrench.

BACKGROUND OF THE INVENTION

During installation of the optical fiber, a microtrench is cut in a roadway, the optical fiber and/or innerduct/microduct is laid in the microtrench and then a fill and sealant are applied over the optical fiber and/or innerduct/microduct to protect them from the environment. Methods of microtenching that can be utilized in the present invention include the methods described in my previous U.S. Pat. Nos. 10,641,414; 10,571,047; 10,571,045; 10,781,942; 10,808,379; 10,808,377 and U.S. patent publication Nos. 20180292027; 20180156357, and 20180106015, the complete disclosures of which are incorporated in their entirety herein by reference.

Installing optical fiber in a microtrench often has problems with the optical fiber cable and/or microduct/innerduct in a microtrench bowing up from the bottom of the microtench and/or rising up from the bottom of the microtrench during filling the microtrench with a fill.

SUMMARY OF THE INVENTION

An objective of the invention is to provide a solution to the problem of the optical fiber and/or innerduct/microduct bowing up from the bottom of the microtrench before or during filling of the microtrench.

The objectives of the invention and other objectives are obtained by a method of securing optical fiber and/or innerduct/microduct 140 within a microtrench 11 by laying the optical fiber and/or innerduct/microduct 140 within a microtrench 11 and inserting a plurality of microtrench plugs 6 into the microtrench 11 above the optical fiber and/or innerduct/microduct 140 to secure the optical fiber and/or innerduct/microduct 140 in the microtrench 11 and reduce bowing of the optical fiber and/or innerduct/microduct 140 up from a bottom of the microtrench 11.

BRIEF DESCRIPTION OF THE DRAWINGS

FIG. 3A illustrates a foam microtrench plug.
FIG. 3B illustrates a spring microtrench plug.
FIG. 3C illustrates a compression microtrench plug.
FIG. 3D illustrates a compression microtrench plug.

DETAILED DESCRIPTION OF THE INVENTION

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention with reference to the attached non-limiting figures.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description.

During installation of the optical fiber cable, a microtrencher is used to cut a microtrench in the roadway, optical fiber cable and/or innerduct/microduct is then laid in the microtrench, and then the microtrench is filled with a fill and sealant over the optical fiber cable and/or innerduct/microduct to protect them from the environment. The present method utilizes a motorized vehicle and a microtrencher to install the optical fiber cable within the microtrench.

Microtrenchers, other devices used in microtrenching, fills, and methods of microtrenching that can be utilized in the present invention include the devices and methods described in my previous U.S. patent publication Nos. 20190226603, 20190086002, 20180292027, 20180156357, and 20180106015, the complete disclosures of which are incorporated in their entirety herein by reference.

Figure 1:
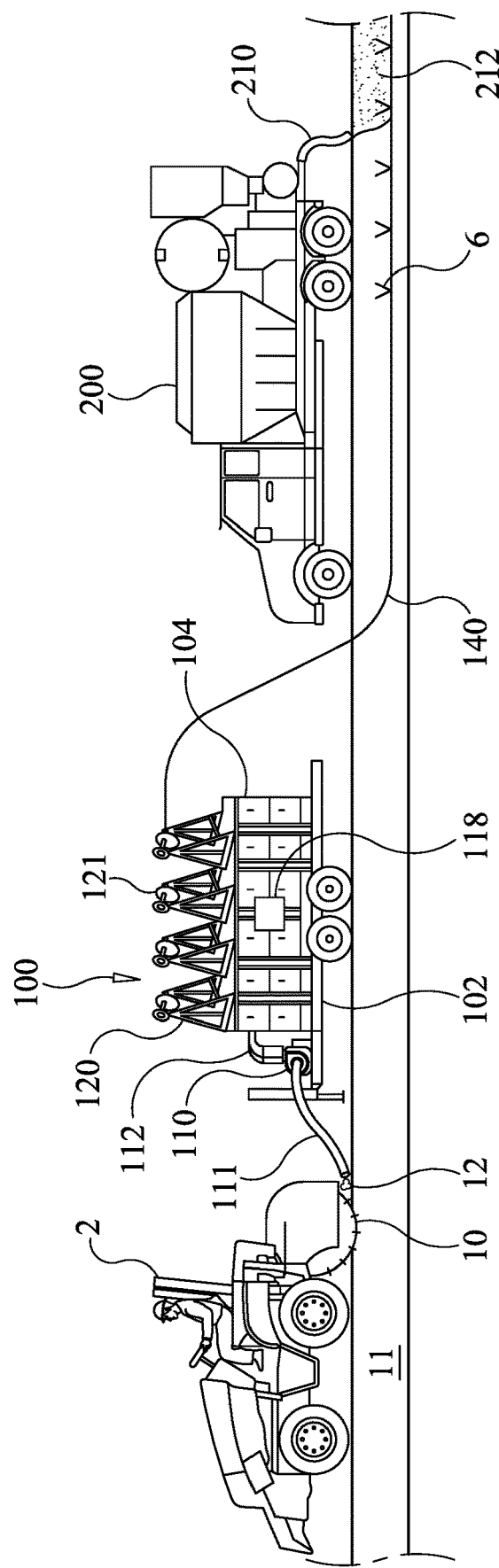
FIG. 1 illustrates a microtrencher, vacuum device and fill device that can be used to cut a microtrench in a roadway, install optical fiber or innerduct/microduct, and then fill and seal the roadway. The optical fiber or innerduct/microduct has reduced bowing by use of microtrench plugs.

An example of suitable devices microtrenching is shown in FIG. 1, shows a multifunctional reel carrier, spoil material handling container device 100 comprising a trailer 102 so that the multifunctional reel carrier, spoil material handling container device 100 can be moved along with a micro trencher 2, which is disclosed in my previous U.S. Pat. No. 10,883,629, which incorporated herein by reference. The multifunctional reel carrier, spoil material handling container device 100 includes at least a first container 104 sized to hold spoil 12 created by the saw (such as a cutting wheel) 10 cutting a microtrench 11. The first container 104 is constructed to hold the spoil 12. A first vacuum device 110 has an inlet 111 disposed at the micro trencher 2 to suck up the spoil 12, and optionally to also remove spoil 12 from the microtrench 11. A vacuum device outlet 112 of the first vacuum device 110 deposits the spoil 12 into the first container 104. The first container 104 has at least one container outlet 118 can have a filter to prevent spoil from being ejected into the air. The container outlet 118 can allow air to enter or leave the first container 104. The device 100 includes at least one reel holder 120 constructed to hold a reel 121 of optical fiber cable or innerduct/microduct 140. A fill device 200 fills the microtrench 11 will fill 212 through the chute 210.

Any suitable microtrencher 2 can be utilized in the present invention. Non-limiting examples of suitable microtrenchers 2 include those made and sold by Ditch Witch, Vermeer, and Marais. A Vermeer RTX 1250 tractor can be used as the motorized vehicle for the microtrencher 2. A microtrencher 2 is a "small rock wheel" specially designed for work in rural or urban areas. The microtrencher 2 is fitted with a cutting wheel 10 that cuts a microtrench 11 with smaller dimensions than can be achieved with conventional trench digging equipment. Microtrench 11 widths usually range from about 6 mm to 130 mm (¼ to 5 inches) with a depth of 750 mm (about 30 inches) or less. Other widths and depths can be used as desired.

With a microtrencher 2, the structure of the road, sidewalk, driveway, or path is maintained and there is no associated damage to the road. Owing to the reduced microtrench 11 size, the volume of waste material (spoil 12) excavated is also reduced. Microtrenchers 2 are used to minimize traffic or pedestrian disturbance during cable laying. A microtrencher 2 can work on sidewalks or in narrow streets of cities, and can cut harder ground than a chain trencher, including cutting through for example but not limited to hard surfaces solid stone, concrete, and asphalt. Softer surfaces include, soil, grass, dirt, sand, and gravel.

Any suitable fill 212 and fill device 200 can be unitized to fill the mictrotrench. Preferably, the fill device 200 and the fill 212 are as disclosed in my U.S. publication No 20190086002 or U.S. publication No. 20180292027, which are incorporated herein by reference.

Figure 2A:
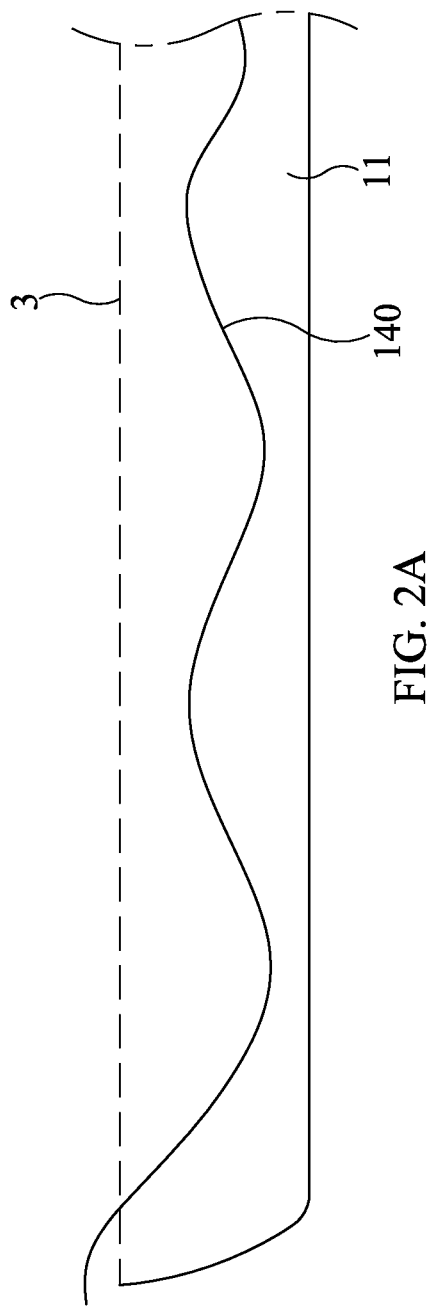
FIG. 2A [Prior Art] illustrates a conventional optical fiber or innerduct/microduct bowing off the bottom of the microtrench.
Figure 2B:
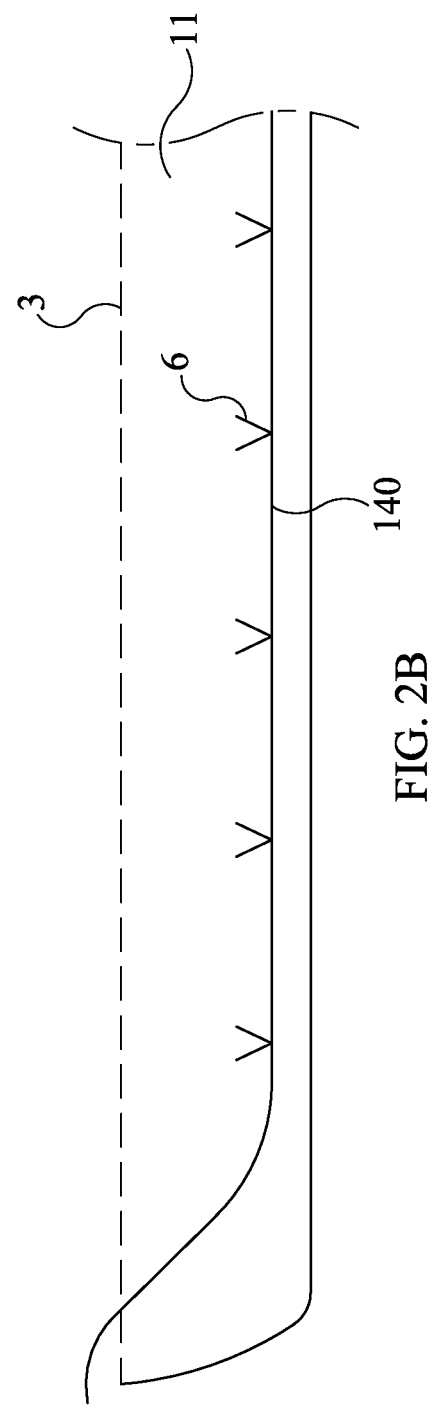
FIG. 2B illustrates the use of microtrench plugs to reduce bowing of the optical fiber or innerduct/microduct.

The present invention provides an improvement over my previous inventions by utilizing a plurality of microtrench plugs 6 to hold down the optical fiber and/or innerduct/microduct 140 during filling of the microtrench 11 with the fill 212, as shown in FIG. 1. A typical problem with conventional microtrenching is that the optical fiber and/or innerduct/microduct 140 can bow up from the bottom of the microtrench 11 as shown in FIG. 2A. The microtrench plugs 6 reduce the bowing of the optical fiber and/or innerduct/microduct 140 as shown in FIGS. 1 and 2B. The microtrench plugs 6 can also prevent the optical fiber and/or innerduct/microduct 140 from rising during filling of the microtrench 11 with the fill 212. The microtrench plugs 6 provide the added advantage that if the fill 212 fails, the microtrench plugs 6 will retain the optical fiber and/or innerduct/microduct 140 within the microtrench 11.

Figure 3E:
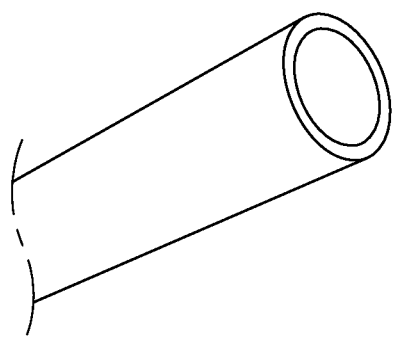
FIG. 3E illustrates a compression microtrench plug.
Figure 3F:
FIG. 3F illustrates a compression microtrench plug.
Figure 3G:
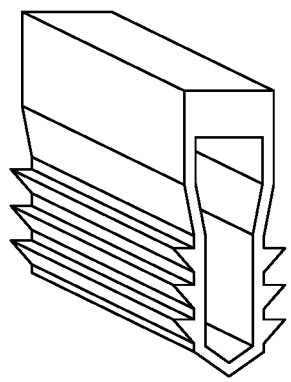
FIG. 3G illustrates a compression microtrench plug.

The microtrench plug 6 can have different forms. Suitable examples of the microtrench plug 6 include a foam plug 7, FIG. 3A, a spring plug 8, FIG. 3B, and compression plugs 9, FIGS. 3C-3G. The microtrench plug 6 contacts at least one inside surface of the microtrench 11. During insertion of the microtrench plug 6, the optical fiber and/or innerduct/microduct 140 can be pushed towards the bottom of the microtrench 11 by the microtrench plug 6 and then the microtrench plug 6 prevents the optical fiber and/or innerduct/microduct 140 from rising towards the roadway surface 3. The microtrench plugs 6 are preferably spaced apart along a length of the optical fiber and/or innerduct/microduct 140. Examples of suitable spacings are from 2 inches to 200 feet, preferably 6 inches to 48 inches.

The microtrench plugs 6 can be formed from any suitable material. For example, compression type microtrench plugs 9 can be formed from a compressible material such as rubber, plastics, polymers, and composites. The spring type microtrench plugs 8 can be formed from a spring material, such as metals, plastics, and composites.

The microtrench plugs 6 contact the surfaces of the microtrench 11. The microtrench plugs 6 are held in place by any of friction against the surface of the microtrench 11, bonding to a surface of the microtrench 11, and/or penetrating into to the surface of the microtrench 11. For example, the microtrench plugs 6 can be compressed and then released within the microtrench 11 so that the microtrench plugs 6 expand to contact the surfaces of the microtrench 11. Alternatively, the microtrench plugs 6 can be formed in the microtrench, such as by using a foam plug 7, which bonds to the surfaces of the microtrench 11. Examples of suitable widths for the microtrench plugs 6 is from 0.5 inch to 6 inches.

During installation, the microtrench plug 6 can be pushed down into the microtrench 11 a desired depth, which pushes the optical fiber and/or innerduct/microduct 140 down to a desired depth before filling and sealing the microtrench 11 with the fill 212. Examples of suitable depths include from 0.5 inch to 60 inches.

The microtrench plugs 6 are preferably spaced apart to allow the fill 212 to contact and/or surround the optical fiber and/or innerduct/microduct 140. If desired, the microtrench plug 6 can be in the form of a long continuous plug so that the fill 212 does not contact the optical fiber and/or innerduct/microduct 140.

Figure 4:
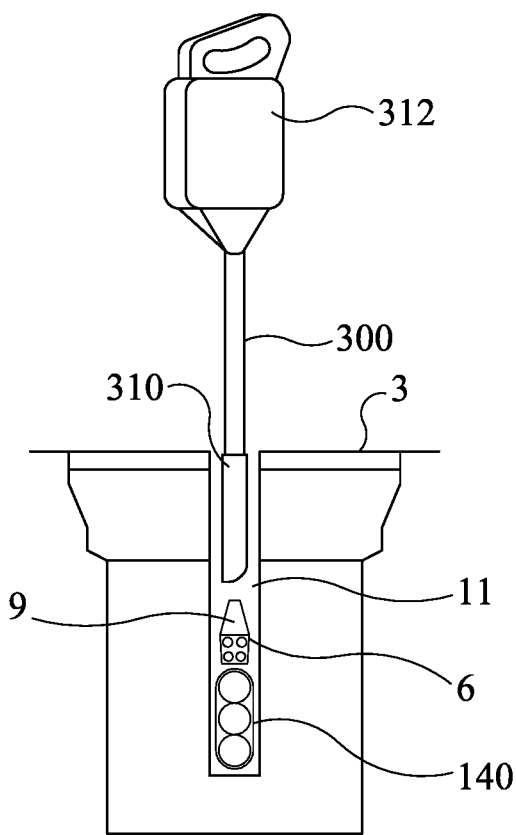
FIG. 4 illustrates a compression microtrench plug installation device.

FIG. 4 shows a compression microtrench plug installation device 300 for inserting compression type microtrench plugs 9 into the microtrench 11, such as those shown in FIGS. 3C-3G. The device 300 has a hollow plug dispenser 310 sized to fit within the microtrench 11, which is connected to a control 312. When the plug dispenser 310 is within the microtrench 11 at the desired depth and location, the control 312 can be actuated to expel the compression type microtrench plug 9 from the end of the plug dispenser 312 and into the microtrench 11. When inside the plug dispenser 310, the compression type microtrench plug 9 is in a compressed state and when expelled into the microtrench 11, the compression type microtrench plug 9 expands until the plug 9 contact the sides of the microtrench 11. The process can be repeated to install additional compression type microtrench plugs 9 into the microtrench 11 to hold the optical fiber and/or innerduct/microduct 140 in place. The chamber 310 can include a spring to bias the plugs 9 towards the end. The control 312 can be any desired control for controlling a flow of plugs 9 from the chamber 310, which controls are now well-known in the art.

Figure 5:
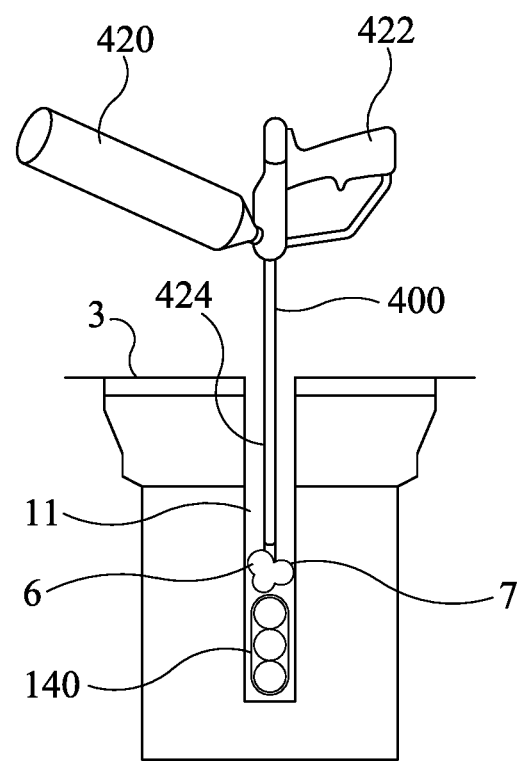
FIG. 5 illustrates a foam microtrench plug installation device.

FIG. 5 shows a foam microtrench plug installation device 400 for inserting foam type microtrench plugs 6 into the microtrench 11, such as shown in FIG. 3A. The device 400 includes a hollow shaft 424 configured to fit within the microtrench 11. The hollow shaft 424 is connected to a source of foam 420 and a foam controller 422. Foam controllers are now well-known and any suitable controller for controlling the flow of a foam forming material can be utilized. Foams are also well-known, and any suitable foam forming material can be utilized, such as commercially available spray cans of foam including Loctite tite foam, Great Stuff, Max Fill, and others. The hollow shaft 424 is inserted into the microtrench 11 and pushes down the optical fiber and/or innerduct/microduct 140 to a desired depth and then the foam controller 422 can be activated to release a source of foam 420 into the microtrench 11 where a small amount of foam 7 contacts the sides of the microtrench 11 and hardens quickly to secure the optical fiber and/or innerduct/microduct 140 in place.

Figure 6:
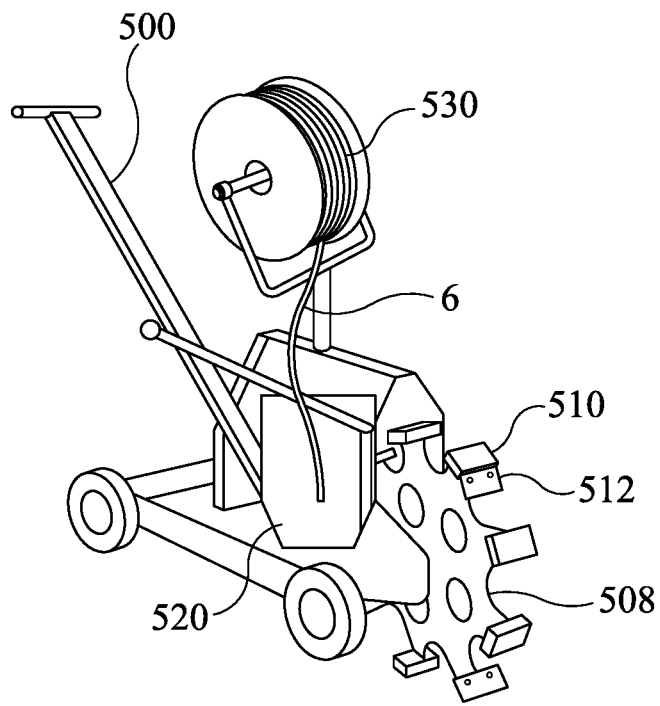
FIG. 6 illustrates a compression microtrench plug installation device.

FIG. 6 shows cutter compression microtrench plug installation device 500 for inserting compression microtrench plugs 6 into the microtrench 11. A rotatable wheel 508 having a plurality of compaction teeth 510 and cutting blades 512 is configured to fit within the microtrench. A reel 530 contains wound continuous plug 6. The continuous plug 6 is fed to the compaction teeth 510, the compaction teeth 510 push the continuous plug 6 and the optical fiber and/or innerduct/microduct 140 down to a desired location in the microtrench 11. The continuous plug 6 is cut to size using the cutting teeth 512 and/or an alternative cutter 520. The depth of the plug 6 can be adjusted by using different size wheel 508 and/or lifting/lowering the wheel 508 to different depths within the microtrench 11.

Figure 7:
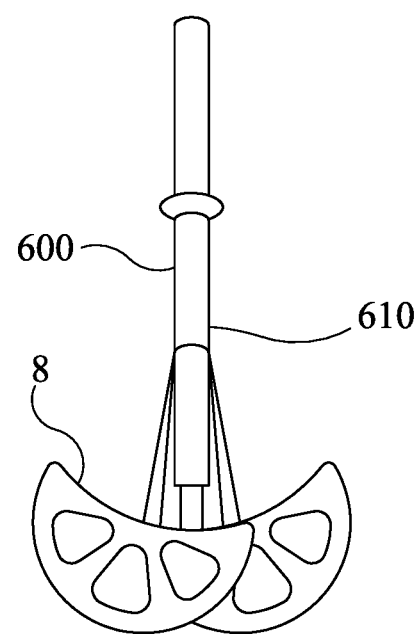
FIG. 7 illustrates a spring microtrench plug installation device.

FIG. 7 shows a spring microtrench plug installation device 600 for inserting spring type microtrench plugs 8 into the microtrench 11, such as shown in FIG. 3B. The device 600 includes a shaft 610 configured to hold a spring type microtrench plug 8 and insert the spring type microtrench plug 8 into the microtrench 11. During installation, the plug 8 is pushed down into the microtrench pushing down the optical fiber and/or innerduct/microduct 140 down to a desired location. Once the spring type microtrench plug 8 is pushed into place, the spring type microtrench plug 8 slides off the end of the shaft 610, and the sides of the plug 8 press against the surfaces of the microtrench 11 holding the plug 8 and optical fiber and/or innerduct/microduct 140 in place.

The different microtrench plug installation devices described herein can be manual, gas powered, power activated, electric, or compressor driven as desired.

REFERENCE NUMBERS

- 2 Microtrencher
- 3 Roadway surface
- 6 Microtrench plug
- 7 Foam plug
- 8 Spring plug
- 9 Compression plug
- 10 Saw blade
- 11 Microtrench
- 12 Spoil
- 100 Multifunctional reel carrier, spoil material handling container device
- 102 Trailer
- 104 First container
- 110 Vacuum device
- 111 Vacuum hose
- 112 Vacuum device outlet
- 118 Container outlet
- 120 Reel holder
- 121 Reel of optical fiber, innerduct/microduct
- 140 Optical fiber, innerduct/microduct
- 200 Fill device
- 210 Chute
- 212 Fill
- 300 Compression microtrench plug installation device
- 310 Plug dispenser chamber
- 312 Plug pusher
- 400 Foam microtrench plug installation device
- 420 Source of foam
- 422 Handle and controller
- 424 Nozzle
- 500 Cutter Compression microtrench plug installation device
- 508 Wheel
- 510 Compaction teeth
- 512 Cutting teeth
- 520 Cutter
- 530 Reel of microtrench plug
- 600 Spring microtrench plug installation device
- 610 Shaft
- 620 Spring loaded microtrench plug To facilitate an understanding of the principles and features of the various embodiments of the present invention, various illustrative embodiments are explained herein. Although example embodiments of the present invention are explained in detail, it is to be understood that other embodiments are contemplated. Accordingly, it is not intended that the present invention is limited in its scope to the details of construction and arrangement of components set forth in the following description or examples. The present invention is capable of other embodiments and of being practiced or carried out in various ways.

As used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the example embodiments, terminology will be resorted to for the sake of clarity. It is intended that each term contemplates its broadest meaning as understood by those skilled in the art and includes all technical equivalents that operate in a similar manner to accomplish a similar purpose.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified. Such other components or steps not described herein can include, but are not limited to, for example, similar components or steps that are developed after development of the disclosed technology.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

The invention claimed is:

1. A method of securing optical fiber and/or innerduct/microduct within a microtrench comprising:
   laying the optical fiber and/or innerduct/microduct within a microtrench;
   inserting a plurality of microtrench plugs into the microtrench above the optical fiber and/or innerduct/microduct to secure the optical fiber and/or innerduct/microduct in the microtrench; and
   filling the microtrench with a fill, wherein the plurality of microtrench plugs are spaced apart and allow the fill to contact and/or surround the optical fiber and/or innerduct/microduct, and the plurality of microtrench plugs reduce bowing of the optical fiber and/or innerduct/microduct up from the bottom of the microtrench.

2. The method according to claim 1, wherein the step of inserting further comprising pushing a first microtrench plug into the microtrench to push the optical fiber and/or innerduct/microduct down to a desired depth within the microtrench.

3. The method according to claim 1, further comprising using a compression microtrench plug installation device to insert the plurality of microtrench plugs into the microtrench, and the plurality of microtrench plugs are compression type microtrench plugs.

4. The method according to claim 1, further comprising using a foam microtrench plug installation device to insert the plurality of microtrench plugs into the microtrench, and the plurality of microtrench plugs are foam type microtrench plugs formed in the microtrench.

5. The method according to claim 1, further comprising using a cutter compression type microtrench plug installation device to insert the plurality of microtrench plugs into the microtrench, cut the plurality of microtrench plugs to a desired length, and the plurality of microtrench plugs are compression type microtrench plugs.

6. The method according to claim 1, further comprising using a spring microtrench plug installation device to insert the plurality of microtrench plugs into the microtrench, and the plurality of microtrench plugs are spring type microtrench plugs.

7. The method according to claim 1, further comprising inserting a fill into the microtrench above the optical fiber or innerduct/microduct.

8. The method according to claim 1, wherein the microtrench plugs are spaced-apart.

9. The method according to claim 1, wherein the microtrench plugs are compressible and after insertion into the microtrench the microtrench plugs expand and contact sidewalls of the microtrench.

10. The method according to claim 9, wherein the microtrench plugs comprise a spring.

11. The method according to claim 9, wherein the microtrench plugs comprise a rubber.

12. The method according to claim 1, wherein the microtrench plugs comprise a foam formed in the microtrench.

\* \* \* \* \*